US012322540B2

(12) United States Patent
Yeo et al.

(10) Patent No.: US 12,322,540 B2
(45) Date of Patent: Jun. 3, 2025

(54) COIL COMPONENT

(71) Applicant: SAMSUNG ELECTRO-MECHANICS CO., LTD., Suwon-si (KR)

(72) Inventors: Jeong Gu Yeo, Suwon-si (KR); Myoung Ki Shin, Suwon-si (KR); Ji Hoon Hwang, Suwon-si (KR); Young Il Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 788 days.

(21) Appl. No.: 17/478,278

(22) Filed: Sep. 17, 2021

(65) Prior Publication Data

US 2022/0139613 A1 May 5, 2022

(30) Foreign Application Priority Data

Nov. 3, 2020 (KR) ........................ 10-2020-0145367

(51) Int. Cl.
*H01F 5/00* (2006.01)
*H01F 27/28* (2006.01)
*H01F 27/29* (2006.01)
*H01F 27/32* (2006.01)

(52) U.S. Cl.
CPC ....... *H01F 27/324* (2013.01); *H01F 27/2852* (2013.01); *H01F 27/292* (2013.01)

(58) Field of Classification Search
CPC ..................................................... H01F 27/324
USPC ......................................................... 336/200
See application file for complete search history.

(56) References Cited

U.S. PATENT DOCUMENTS

| | | | | |
|---|---|---|---|---|
| 8,593,247 B2 | 11/2013 | Jeong et al. | | |
| 2012/0274435 A1* | 11/2012 | Jeong | H01F 17/0033 | 336/200 |
| 2014/0009254 A1* | 1/2014 | Ohkubo | H01F 17/0033 | 336/192 |
| 2015/0102891 A1* | 4/2015 | Yoon | H01F 27/2804 | 336/200 |

(Continued)

FOREIGN PATENT DOCUMENTS

| | | |
|---|---|---|
| JP | 2019-186523 A | 10/2019 |
| KR | 10-2012-0122590 A | 11/2012 |

(Continued)

OTHER PUBLICATIONS

Korean Office Action dated Mar. 13, 2025 issued in Korean Patent Application No. 10-2020-0145367 (with English translation).

*Primary Examiner* — Ronald Hinson
(74) *Attorney, Agent, or Firm* — Morgan Lewis & Bockius LLP

(57) ABSTRACT

A coil component includes a body, a support substrate disposed in the body, a coil unit disposed on the support substrate to be perpendicular to a first surface of the body and including first and second lead-out portions exposed to first surface of the body and spaced apart from each other, first and second external electrodes disposed to be spaced apart from each other on the first surface of the body and connected to the first and second lead-out portions, respectively, a slit portion formed in a region of one surface of the body between the first and second external electrodes, and a slit insulating layer disposed in the slit portion.

20 Claims, 7 Drawing Sheets

(56) References Cited

U.S. PATENT DOCUMENTS

| | | | | |
|---|---|---|---|---|
| 2016/0035476 | A1* | 2/2016 | Mimura | H01F 41/046 336/199 |
| 2019/0252113 | A1* | 8/2019 | Ku | H01F 17/0013 |
| 2019/0311841 | A1 | 10/2019 | Watanabe et al. | |
| 2020/0143976 | A1 | 5/2020 | Jeon et al. | |
| 2020/0219651 | A1 | 7/2020 | Kang et al. | |
| 2020/0335256 | A1 | 10/2020 | Jung et al. | |
| 2021/0020354 | A1* | 1/2021 | Watanabe | H01F 27/2852 |

FOREIGN PATENT DOCUMENTS

| | | | |
|---|---|---|---|
| KR | 10-2019-0062342 | A | 6/2019 |
| KR | 10-2019-0096679 | A | 8/2019 |
| KR | 10-2093148 | B1 | 3/2020 |
| KR | 10-2130677 | B1 | 7/2020 |
| KR | 10-2020-0122779 | A | 10/2020 |

* cited by examiner

COIL COMPONENT

CROSS-REFERENCE TO RELATED APPLICATION

This application claims the benefit of priority to Korean Patent Application No. 10-2020-0145367 filed on Nov. 3, 2020 in the Korean Intellectual Property Office, the disclosure of which is incorporated herein by reference in its entirety.

TECHNICAL FIELD

The present disclosure relates to a coil component.

BACKGROUND

An inductor, a coil component, is a typical passive electronic component used in electronic devices along with a resistor and a capacitor.

As electronic devices are increasingly implemented with higher performance and are formed to be compact, a larger number of electronic components are used in electronic devices and electronic components are reduced in size.

In the case of a thin film-type coil component, a body is formed by stacking and curing a magnetic composite sheet in which magnetic metal powder is dispersed in an insulating resin on a substrate on which a coil unit is formed by plating, and external electrodes are formed on a surface of the body.

SUMMARY

An aspect of the present disclosure may provide a coil component in which an electrical short-circuit between external electrodes is prevented.

According to an aspect of the present disclosure, a coil component may include: a body; a support substrate disposed in the body; a coil unit disposed on the support substrate to be perpendicular to a first surface of the body and including first and second lead-out portions exposed to the first surface of the body and spaced apart from each other; first and second external electrodes disposed to be spaced apart from each other on the first surface of the body and connected to the first and second lead-out portions, respectively; a slit portion formed in a region of the first surface of the body between the first and second external electrodes; and a slit insulating layer disposed in the slit portion.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
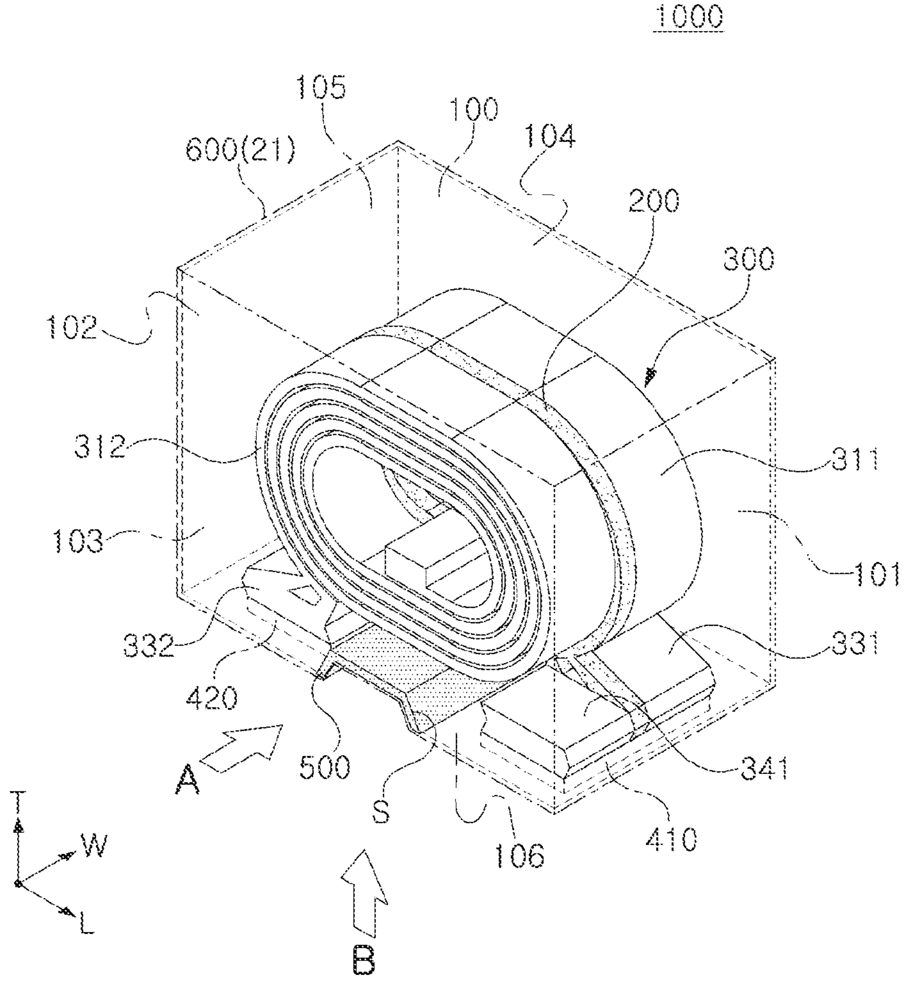
FIG. 1 is a view schematically illustrating a coil component according to an exemplary embodiment in the present disclosure.

In the drawings, an L direction may be defined as a first direction or a length direction, a W direction may be defined as a second direction or a width direction, and a T direction may be defined as a third direction or a thickness direction.

Hereinafter, a coil component according to an exemplary embodiment in the present disclosure will be described in detail with reference to the accompanying drawings, and in the description with reference to the accompanying drawings, the same or corresponding components are denoted by the same reference numerals and duplicate descriptions thereof will be omitted.

Various types of electronic components are used in electronic devices, and various types of coil components may be appropriately used between these electronic components to remove noise.

That is, in an electronic device, a coil component may be used as a power inductor, a high frequency (HF) inductor, a general bead, a high frequency bead (GHz bead), a common mode filter, and the like.

Figure 2:
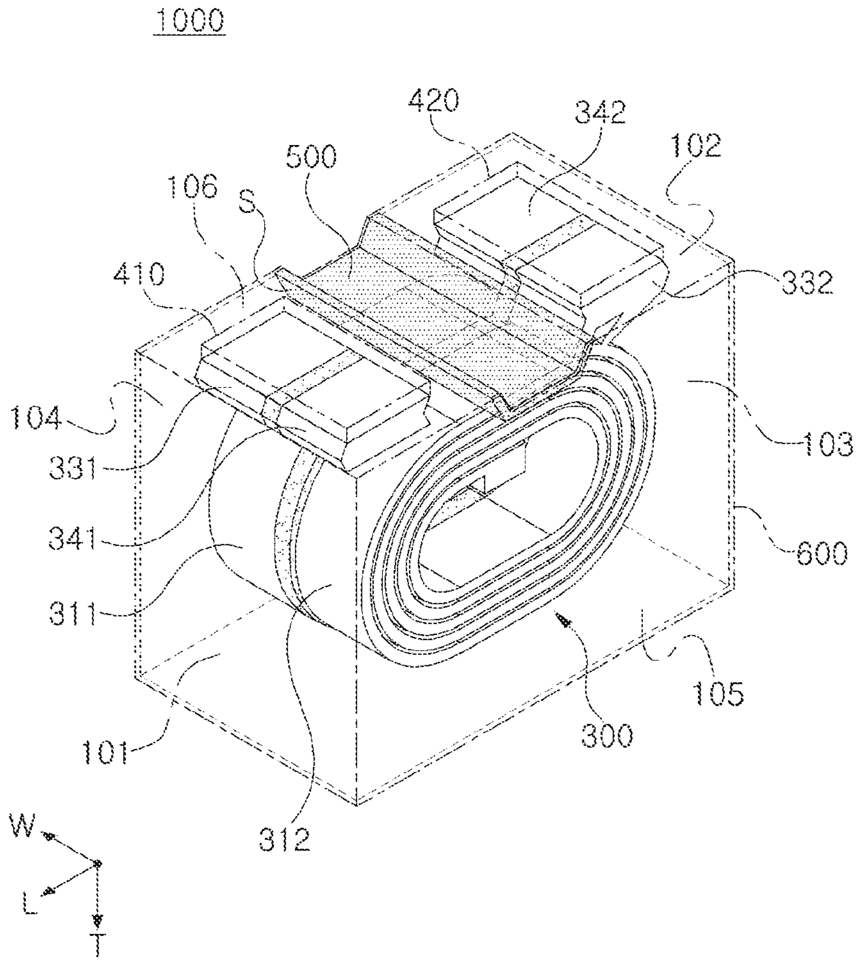
FIG. 2 is a schematic bottom view of a coil component according to an exemplary embodiment in the present disclosure.
Figure 3:
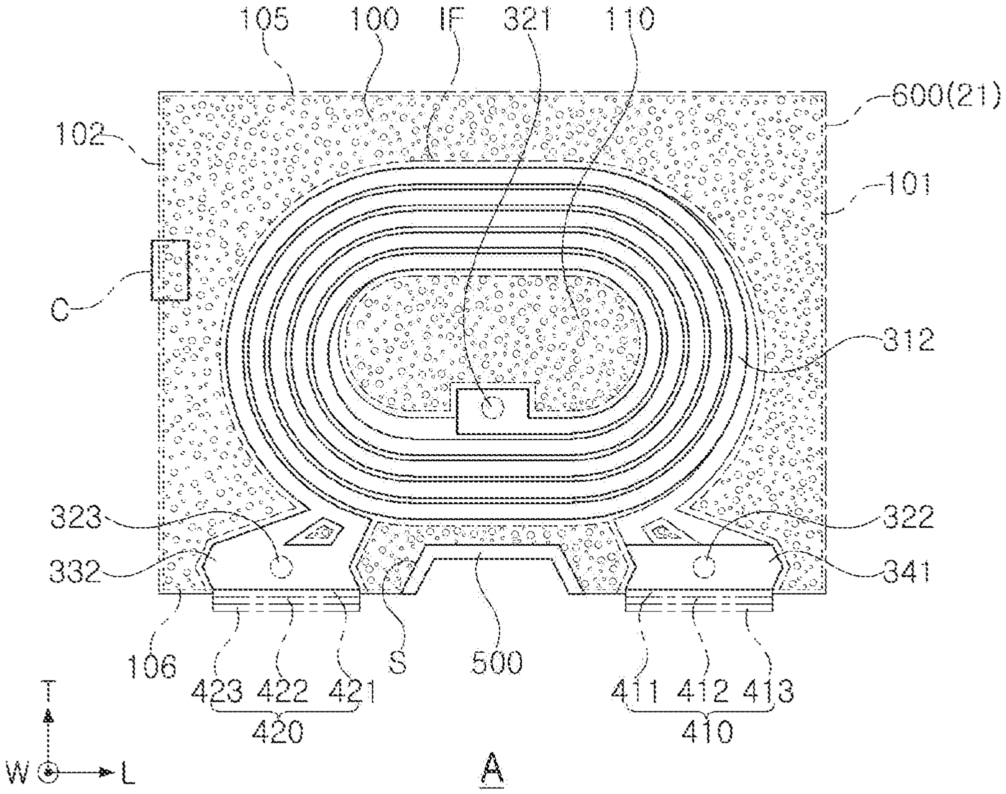
FIG. 3 is a view schematically illustrating a coil component viewed in direction A of FIG. 1.
Figure 4:
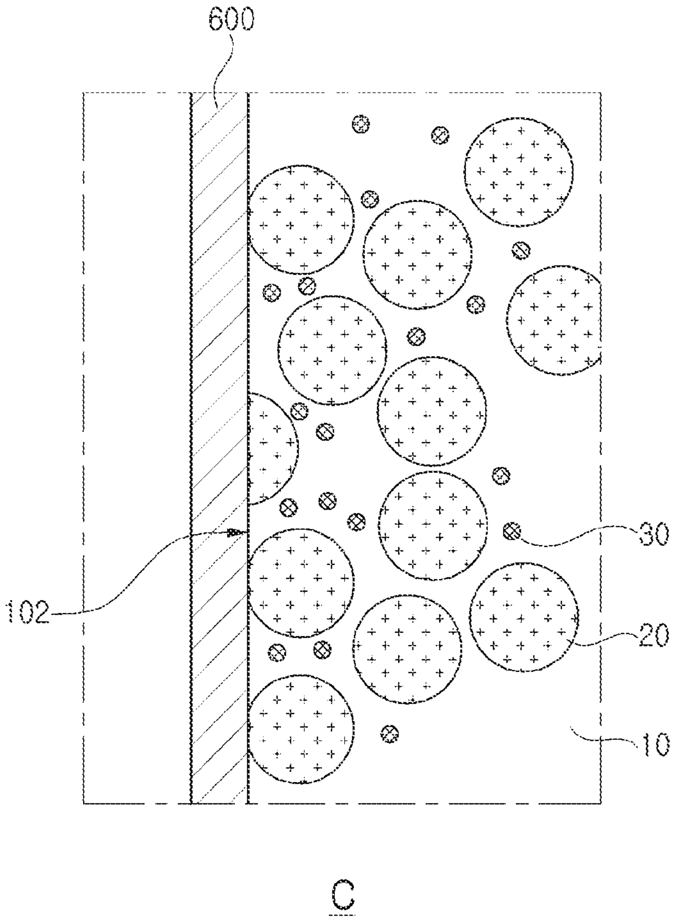
FIG. 4 is an enlarged view illustrating an example of C of FIG. 3.
Figure 5:
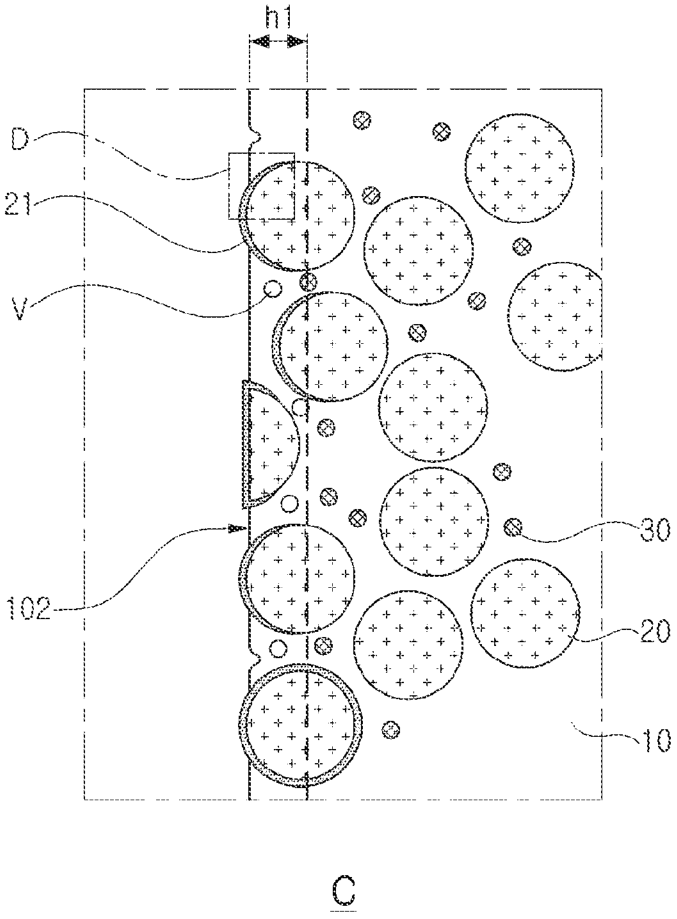
FIG. 5 is an enlarged view illustrating another example of C of FIG. 3.
Figure 6:
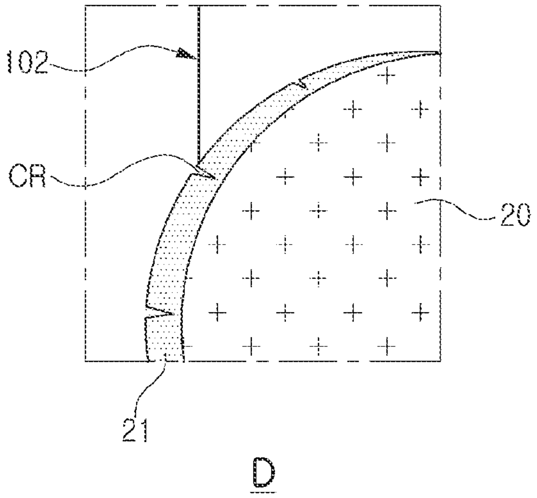
FIG. 6 is an enlarged view of D in FIG. 5.
Figure 7:
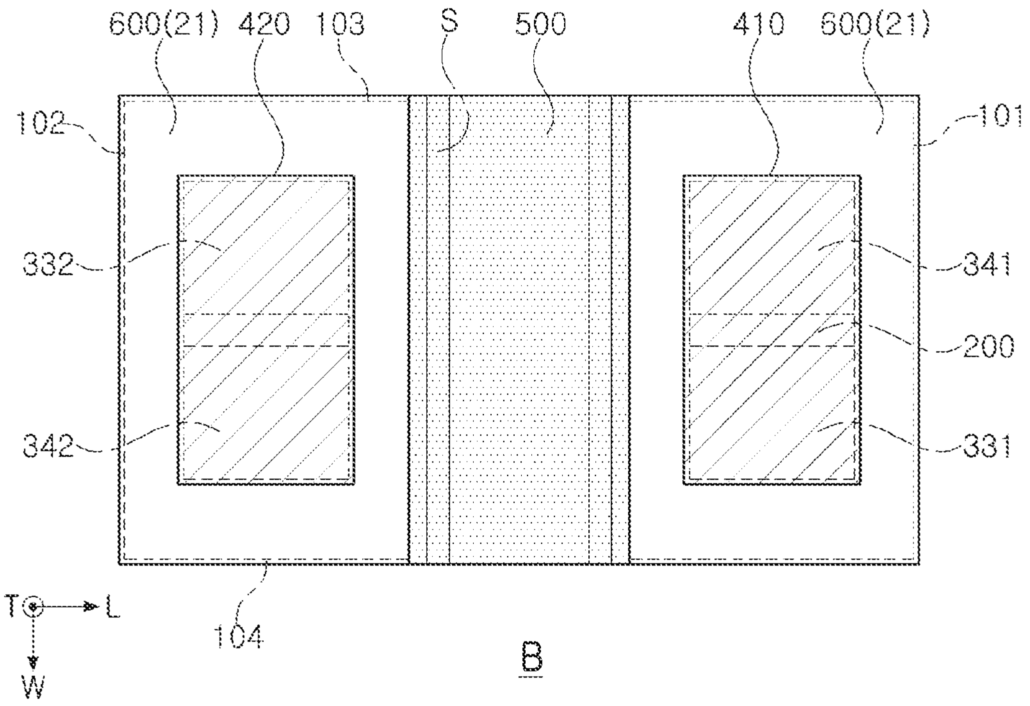
FIG. 7 is a view schematically illustrating an example viewed in direction B of FIG. 1.
Figure 8:
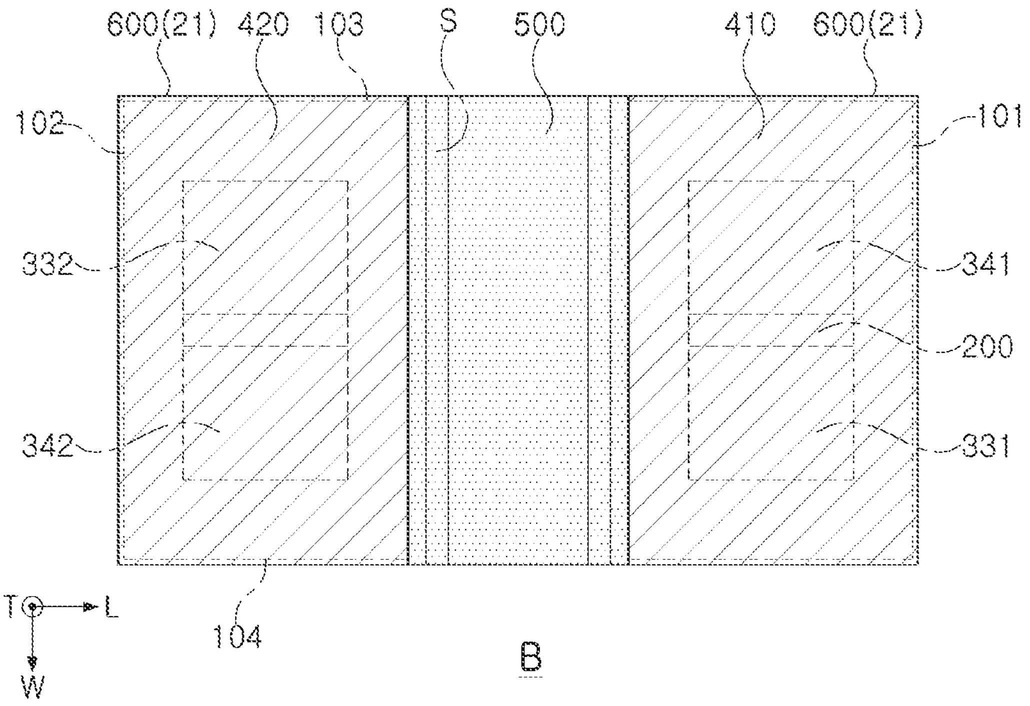
FIG. 8 is a view schematically illustrating another example viewed in direction B of FIG. 1.
Figure 9:
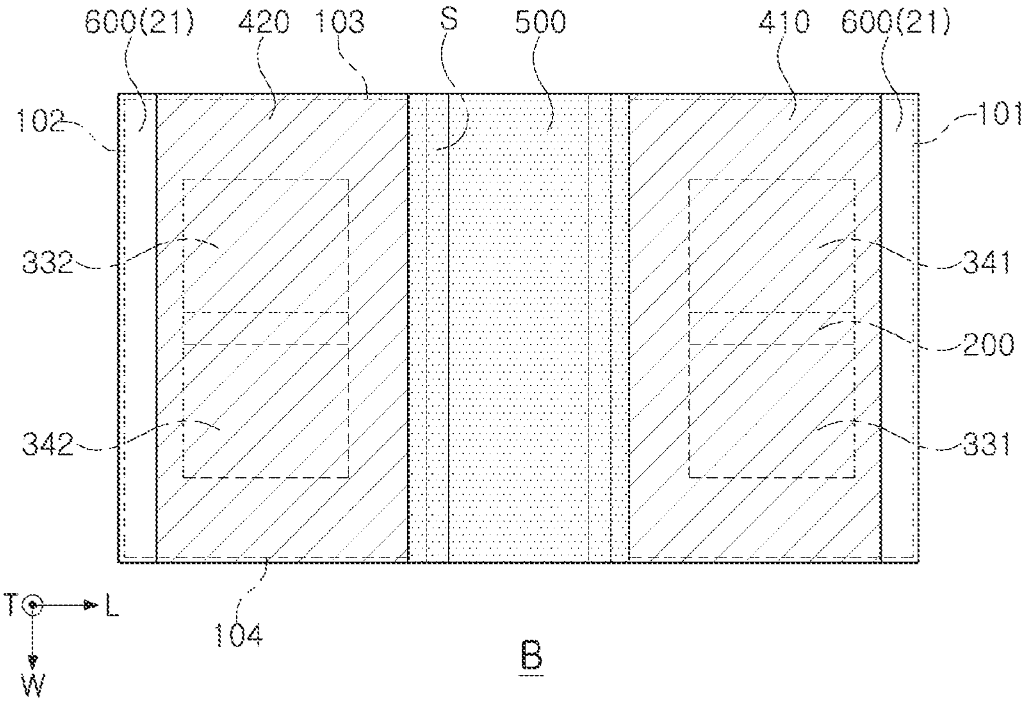
FIG. 9 is a view schematically illustrating another example viewed in direction B of FIG. 1.

FIG. 1 is a view schematically illustrating a coil component according to an exemplary embodiment in the present disclosure. FIG. 2 is a schematic bottom view of a coil component according to an exemplary embodiment in the present disclosure. FIG. 3 is a view schematically illustrating a coil component viewed in direction A of FIG. 1. FIG. 4 is an enlarged view illustrating an example of C of FIG. 3. FIG. 5 is an enlarged view illustrating another example of C of FIG. 3. FIG. 6 is an enlarged view of D of FIG. 5. FIG. 7 is a view schematically illustrating an example viewed in direction B of FIG. 1. FIG. 8 is a view schematically illustrating another example viewed in direction B of FIG. 1. FIG. 9 is a view schematically illustrating another example viewed in direction B of FIG. 1. Meanwhile, FIG. 3 is a view projecting an internal structure of a coil component according to an exemplary embodiment in the present disclosure, viewed in direction A of FIG. 1.

Referring to FIGS. 1 through 9, a coil component 1000 according to an exemplary embodiment in the present disclosure may include a body 100, a support substrate 200, a coil unit 300, external electrodes 410 and 420, a slit portion S, and a slit insulating layer 500 and may further include a surface insulating layer 600.

The body 100 forms an exterior of the coil component 1000 according to this exemplary embodiment and includes the coil unit 300 embedded therein.

The body 100 may have a hexahedral shape as a whole.

Referring to FIGS. 1 to 3, the body 100 includes a first surface 101 and a second surface 102 facing each other in a length direction L, a third surface 103 and a fourth surface 104 facing each other in a width direction W, and a fifth surface 105 and a sixth surface 106 facing each other in a thickness direction T. Each of the first to fourth surfaces 101, 102, 103, and 104 of the body 100 corresponds to a wall surface of the body 100 that connects the fifth surface 105 and the sixth surface 106 of the body 100. Hereinafter, both end surfaces (first end surface and second end surface) of the body 100 may refer to the first surface 101 and the second surface 102 of the body, both side surfaces (first side surface and second side surface) of the body 100 may refer to the third surface 103 and the fourth surface 104 of the body. In addition, first main surface and second main surface of the body 100 may refer to the sixth surface 106 and the fifth surface 105 of the body 100, respectively.

By way of example, the body 100 may be formed such that the coil component 1000 according to the present exemplary embodiment including the external electrodes 410 and 420 and the surface insulating layers 600 to be described later has a length of 1.0 mm, a width of 0.5 mm, and a thickness of 0.8 mm, but is not limited thereto. Meanwhile, the aforementioned dimensions are merely design values that do not reflect process errors, etc., and thus, it should be appreciated that dimensions within a range admitted as a processor error fall within the scope of the present disclosure.

Based on an optical microscope or a scanning electron microscope (SEM) image for a length directional (L)-thickness directional (T) cross-section at a width-directional (W) central portion of the coil component 1000, the length of the coil component 1000 may refer to a maximum value among lengths of a plurality of segments parallel to the length direction L when outermost boundary lines of the coil component 1000 illustrated in the image of the cross-section are connected. Alternatively, the length of the coil component 1000 described above may refer to a minimum value among the lengths of a plurality of segments parallel to the length direction L when outermost boundary lines of the coil component 1000 illustrated in the image of the cross-section are connected. Alternatively, the length of the coil component 1000 described above may refer to an arithmetic mean value of at least three of the plurality of segments parallel to the length direction L when the outermost boundary lines of the coil component 1000 illustrated in the image of the cross-section are connected.

Based on the optical microscope or SEM image for the length directional (L)-thickness directional (T) cross-section at the width-directional (W) central portion of the coil component 1000, the thickness of the coil component 1000 may refer to a maximum value among lengths of a plurality of segments parallel to the thickness direction T when outermost boundary lines of the coil component 1000 illustrated in the image of the cross-section are connected. Alternatively, the thickness of the coil component 1000 may refer to a minimum value among the lengths of a plurality of segments parallel to the thickness direction T when outermost boundary lines of the coil component 1000 illustrated in the image of the cross-section are connected. Alternatively, the thickness of the coil component 1000 described above may refer to an arithmetic mean value of at least three of the plurality of segments parallel to the thickness direction T when the outermost boundary lines of the coil component 1000 illustrated in the image of the cross-section are connected.

Based on an optical microscope or SEM image for a length directional (L)-width directional (W) cross-section at a thickness-directional (T)-central portion of the coil component 1000, the width of the coil component 1000 may refer to a maximum value among lengths of a plurality of segments parallel to the width direction W when outermost boundary lines of the coil component 1000 illustrated in the image of the cross-section are connected. Alternatively, the width of the coil component 1000 may refer to a minimum value among the lengths of a plurality of segments parallel to the width direction W when outermost boundary lines of the coil component 1000 illustrated in the image of the cross-section are connected. Alternatively, the width of the coil component 1000 described above may refer to an arithmetic mean value of at least three of the plurality of segments parallel to the width direction W when the outermost boundary lines of the coil component 1000 illustrated in the image of the cross-section are connected.

Alternatively, each of the length, width, and thickness of the coil component 1000 may be measured by a micrometer measurement method. With the micrometer measurement method, each of the length, width, and thickness of the coil component 1000 may be measured by setting a zero point with a gage repeatability and reproducibility (R&R) micrometer, inserting the coil component 1000 according to the present exemplary embodiment into a tip of the micrometer, and turning a measurement lever of the micrometer. In measuring the length of the coil component 1000 by the micrometer measurement method, the length of the coil component 1000 may refer to a value measured once or an arithmetic mean of values measured multiple times. This may equally be applied to the width and thickness of the coil component 1000.

The body 100 includes magnetic metal powder particles 20 and 30 and an insulating resin 10. Specifically, the body 100 may be formed by stacking one or more magnetic composite sheets including the insulating resin 10 and the magnetic metal powder particles 20 and 30 dispersed in the insulating resin 10.

Magnetic metal powder particles 20 and 30 may include at least any one selected from the group consisting of iron (Fe), silicon (Si), chromium (Cr), cobalt (Co), molybdenum (Mo), aluminum (Al), niobium (Nb), copper (Cu) and nickel (Ni). For example, the magnetic metal powder particles 20 and 30 may be at least one of pure iron powder, Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—Cr—Si alloy powder, Fe—Si—Cu—Nb-based alloy powder, Fe—Ni—Cr-based alloy powder, and Fe—Cr—Al-based alloy powder.

Magnetic metal powder particles 20 and 30 may be amorphous or crystalline. For example, the magnetic metal powder particles 20 and 30 may be Fe—Si—B—Cr-based amorphous alloy powder particles, but are not limited thereto. The magnetic metal powder particles 20 and 30 may each have an average diameter of about 0.1 μm to 30 μm, but are not limited thereto.

The magnetic metal powder particles 20 and 30 may include a first powder 20 and a second powder 30 having a particle diameter smaller than the first powder 20. In the present disclosure, the term particle diameter or average diameter may refer to a particle size distribution expressed by $D_{90}$ or $D_{50}$. In the case of the present disclosure, since the magnetic metal powder particles 20 and 30 include the first powder 20 and the second powder 30 having a particle diameter smaller than the first powder 20, the second powder 30 may be disposed in a space between the first powder particles 20, and as a result, a ratio of filling a magnetic material in the body 100 may be improved. Meanwhile, hereinafter, for convenience of explanation, it is assumed that the magnetic metal powder particles 20 and 30 of the body 100 include the first powder 20 and the second powder 30 having different particle diameters, but the scope of the invention is not limited thereto. For example, as another non-limiting example of the present disclosure, the magnetic metal powder may include three types of powder particles having different particle diameters. An insulating coating layer may be formed on surfaces of the magnetic metal powder particles 20 and 30, but is not limited thereto.

The insulating resin 10 may include, but is not limited to, epoxy, polyimide, liquid crystal polymer, or the like alone or in combination.

The body 100 has a core 110 penetrating the support substrate 200 and the coil unit 300 to be described later. The core 110 may be formed as the magnetic composite sheet fills a through-hole of the coil unit 300, but is not limited thereto.

The support substrate 200 is disposed in the body 100. The support substrate 200 is a component supporting the coil unit 300 to be described later.

The support substrate 200 may be formed of an insulating material including a thermosetting insulating resin such as an epoxy resin, a thermoplastic insulating resin such as polyimide, or a photosensitive insulating resin or may be formed of an insulating material prepared by impregnating a reinforcing material such as glass fiber or inorganic filler in this insulating resin. As an example, the support substrate 200 may be formed of materials such as prepreg, Ajinomoto build-up film (ABF), FR-4, a bismaleimide triazine (BT) resin, photo imageable dielectric (PID), a copper clad laminate (CCL), etc., but is not limited thereto.

As an inorganic filler, at least one selected from the group consisting of silica ($SiO_2$), alumina ($Al_2O_3$), silicon carbide (SiC), barium sulfate ($BaSO_4$), talc, mud, mica powder, aluminum hydroxide ($AlOH_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

When the support substrate 200 is formed of an insulating material including a reinforcing material, the support substrate 200 may provide more excellent rigidity. When the support substrate 200 is formed of an insulating material not containing glass fiber, the support substrate 100 may reduce an overall thickness of the coil unit 300 (which refers to the sum of dimensions of the coil unit and the support substrate along the width direction W of FIG. 1) to advantageously reduce a width of a component. When the support substrate 200 is formed of an insulating material including a photosensitive insulating resin, the number of processes for forming the coil unit 300 may be reduced, advantageous in reducing production costs and forming fine vias.

The coil unit 300 is disposed on the support substrate 200. The coil unit 300 is embedded in the body 100 to manifest the characteristics of the coil component. For example, when the coil component 1000 of the present exemplary embodiment is used as a power inductor, the coil unit 300 may serve to stabilize power of an electronic device by storing an electric field as a magnetic field and maintaining an output voltage.

The coil unit 300 is formed on at least one of both surfaces of the support substrate 200 facing each other and forms at least one turn. The coil unit 300 is disposed on one surface and the other surface of the support substrate 200 facing each other in the width direction W of the body 100 and is disposed perpendicular to the sixth surface 106 of the body 100. In the present exemplary embodiment, the coil unit 300 includes coil patterns 311 and 312, vias 321, 322 and 323, and lead-out portions 331, 341, 332, and 342.

The first coil pattern 311 and the second coil pattern 312 may have a planar spiral shape forming at least one turn around the core 110 of the body 100. As an example, based on the direction of FIG. 1, the first coil pattern 311 may form at least one turn around the core 110 on the rear surface of the support substrate 200. The second coil pattern 312 may form at least one turn around the core 110 on the front surface of the support substrate 200. In each of the first and second coil patterns 311 and 312, ends of the outermost turns connected to the lead patterns 331 and 332 extend further toward the sixth surface 106 of the body 100 from a central portion of the body 100 in the thickness direction T. As a result, the first and second coil patterns 311 and 322 may increase the number of turns of the entirety of the coil unit 300 as compared to a case where the ends of the outermost turns of the coil are formed only up to the central portion of the body in the thickness direction T.

The lead-out portions 331, 341, 332, and 342 include lead patterns 331 and 332 and auxiliary lead patterns 341 and 342. Specifically, based on the direction of FIG. 1, the first lead-out portions 331 and 341 include a first lead pattern 331 extending from the first coil pattern 311 on the rear surface of the support substrate 200 and exposed to the sixth surface 106 of the body 100 and a first auxiliary lead pattern 341 disposed to correspond to the first lead pattern 331 on the front surface of the support substrate 200 and spaced apart from the second coil pattern 312. Based on the direction of FIG. 1, the second lead-out portions 332 and 342 include a second lead pattern 332 extending from the second coil pattern 312 on the front surface of the support substrate 200 and exposed to the sixth surface 106 of the body 100 and a second auxiliary lead pattern 342 (See FIGS. 7 and 8) disposed to correspond to the second lead pattern 332 on the rear surface of the support substrate 200 and spaced apart from the first coil pattern 311. The first lead-out portions 331 and 341 and the second lead-out portions 332 and 342 are exposed to be spaced apart from each other on the sixth surface of the body 100 and are in contact with and connected to first and second external electrodes 410 and 420 to be described later, respectively. The lead patterns 331 and 332 and the auxiliary lead patterns 341 and 342 may have through portions penetrating the lead patterns 331 and 332 and the auxiliary lead patterns 341 and 342. In this case, since at least a part of the body 100 is disposed in the through portions, a coupling force between the body 100 and the coil unit 300 may be improved (anchoring effect). Further, the through portions may penetrate the support substrate 200 disposed between lead patterns 331 and 332 and the auxiliary lead patterns 341 and 342, but the scope of the present disclosure is not limited thereto.

Meanwhile, the aforementioned auxiliary lead patterns 341 and 342 may be omitted in the present exemplary embodiment when an electrical connection relationship between the coil unit 300 and the external electrodes 410 and 420 to be described later is considered, and thus, a case where the auxiliary lead patterns 341 and 342 are omitted may be within the scope of the present disclosure. However, when the auxiliary lead-out portions 341 and 342 are formed at positions and have sizes symmetrical to the lead patterns 331 and 332 as in the present exemplary embodiment, the external electrodes 410 and 420 formed on the sixth surface 106 of the body 100 may be formed to be symmetrical to each other, thereby reducing an appearance defect.

The first via 321 connects inner ends of the innermost turns of the first and second coil patterns to each other through the support substrate 200. The second via 322 connects the first lead pattern 331 and the first auxiliary lead pattern 341 to each other through the support substrate 200. The third via 323 connects the second lead pattern 332 and the second auxiliary lead pattern 342 to each other through the support substrate 200. Accordingly, the coil unit 300 functions as a single coil connected as a whole.

Meanwhile, as described above, since the auxiliary leading patterns 341 and 342 are components independent of an electrical connection relationship between the coil unit 300 and the external electrodes 410 and 420 to be described later, a case where the second and third vias 322 and 323 are omitted may also be within the scope of the present disclosure. However, when the lead patterns 341 and 342 and the auxiliary lead patterns 341 and 342 are connected by the second and third vias 322 and 323 as in the present exemplary embodiment, connection reliability of the coil unit 300 and the external electrodes 410 and 420 may be improved.

At least one of the coil patterns 311 and 312, the vias 321, 322, and 323, the lead patterns 331 and 332, and the auxiliary lead patterns 341 and 342 may include at least one conductive layer.

As an example, when the second coil pattern 312, the vias 321, 322, and 323, the second lead pattern 332, and the first auxiliary lead pattern 341 are formed by plating on the front surface (based on the directions of FIG. 1) of the support substrate 200, each of the second coil pattern 312, vias 321, 322, and 323, the second lead pattern 332, and the first auxiliary lead pattern 341 may include a seed layer and an electroplating layer. The seed layer may be formed by an electroless plating method or a vapor deposition method such as sputtering. Each of the seed layer and the electroplating layer may have a single-layer structure or a multilayer structure. The electroplating layer of a multilayer structure may be formed in a conformal film structure in which one electroplating layer is covered by another electroplating layer or in a shape in which another electroplating layer is stacked on only one surface of one electroplating layer. The seed layer of the second coil pattern 312, the seed layer of the vias 321, 322, and 323, and the seed layer of the second lead pattern 332 may be integrally formed so that a boundary may not be formed therebetween, but is not limited thereto. The electroplating layer of the second coil pattern 312, the electroplating layer of the vias 321, 322, and 323, and the electroplating layer of the second lead pattern 332 may be integrally formed so that a boundary may not be formed therebetween, but is not limited thereto.

The coil patterns 311 and 312, the vias 321, 322, and 323, the lead patterns 331 and 332, and the auxiliary lead patterns 341 and 342 may each include a conductive material such as copper (Cu), aluminum (Al), silver (Ag), tin (Sn), gold (Au), nickel (Ni), lead (Pb), titanium (Ti), chromium (Cr), molybdenum (Mo), or alloys thereof, but are not limited thereto.

In the case of this exemplary embodiment, since the coil unit 300 is disposed perpendicular to the sixth surface 106 of the body 100, a mounting surface, a mounting area may be reduced, while a volume of the body 100 and the coil unit 300 is maintained. Therefore, a larger number of electronic components may be mounted on a mounting board having the same area. In addition, in the case of the present exemplary embodiment, since the coil unit 300 is disposed perpendicular to the sixth surface 106 of the body 100, the mounting surface, a direction of a magnetic flux induced to the core 110 by the coil unit 300 is parallel to the sixth surface 106 of the body 100. As a result, noise induced to the mounting surface of the mounting board may be relatively reduced.

The external electrodes 410 and 420 are disposed spaced apart from each other on the sixth surface 106 of the body 100 and are connected to the lead-out portions 331, 332, 341, and 342, respectively. Specifically, the first external electrode 410 is disposed on the sixth surface 106 of the body 100 and is in contact with the first lead-out portions 331 and 341. The second external electrode 420 is spaced apart from the first external electrode 410 on the sixth surface 106 of the body 100 and is in contact with the second lead-out portions 332 and 342. Meanwhile, the support substrate 200 may be disposed between the first lead pattern 331 and the first auxiliary lead pattern 341 and exposed to the sixth surface 106 of the body 100, and in this case, a recess may be formed in a region of the first external electrode 410 corresponding to the support substrate 200 exposed to the sixth surface 106 of the body 100 due to plating variations, but is limited thereto.

When the coil component 1000 according to the present exemplary embodiment is mounted on a printed circuit board (PCB) or the like, the external electrodes 410 and 420 electrically connect the coil component 1000 to the PCB or the like. As an example, the coil component 1000 according to the present exemplary embodiment may be mounted so that the sixth surface 106 of the body 100 faces an upper surface of the PCB, and the external electrodes 410 and 420 disposed to be spaced apart from each other on the sixth surface of the body 100 and a connection portion of the PCB may be electrically connected.

The external electrodes 410 and 420 may be formed of copper (Cu), aluminum (Al), silver (Ag), tin (Sn), gold (Au), nickel (Ni), lead (Pb), chromium (Cr), titanium (Ti), or an alloy thereof, but is not limited thereto.

The external electrodes 410 and 420 may include bonding layers 411 and 421 in contact with the first and second lead-out portions 331, 341; 332, and 342 and plating layers 412, 413; 422, and 423 formed on the bonding layers 411 and 421, respectively. That is, each of the external electrodes 410 and 420 may be formed in a multi-layered structure. Specifically, the first external electrode 410 includes a first bonding layer 411 in contact with the first lead-out portions 331 and 341 and first plating layers 412 and 413 formed on the first bonding layer 411. The second external electrode 420 includes a second bonding layer 421 in contact with the second lead-out portions 332 and 342 and second plating layers 422 and 423 formed on the second bonding layer 421. The bonding layers 411 and 421 may be conductive resin layers formed by applying a conductive paste including a conductive powder containing at least one of silver (Ag) and copper (Cu) and an insulating resin to the sixth surface 106 of the body 100 and curing the conductive paste. Alternatively, the bonding layers 411 and 421 may be, for example, metal layers formed by copper (Cu) electroplating or sputtering. When the bonding layers 411 and 421 are conductive resin layers, a bonding force between the external electrodes 410 and 420 and the body 100 may be improved. When the bonding layers 411 and 421 are metal layers, an overall thickness of the external electrodes 410 and 420 may be reduced, thereby reducing an overall thickness of the component. The plating layers 412, 413, 421, and 423 may include nickel plating layers 412 and 422 formed with bonding layers 411 and 421 as seed layers, and tin plating layers 413 and 423 disposed on the nickel plating layers 412 and 422.

Referring to FIG. 8, the external electrodes 410 and 420 may be spaced apart from each other in the length direction L on the sixth surface 106 of the body 100 and may cover the entirety of the sixth surface 106 of the body 100 excluding one region of the sixth surface 106 of the body 100 in which the slit portion S and the slit insulating layer 500 to be described layer are formed. Specifically, the second external electrode 420 may cover the entirety of a left region of the region in which the slit portion S and the slit insulating layer 500 are formed in the sixth surface 106 of the body 100 shown in FIG. 8, and the first external electrode 410 may cover the entirety of a right region of the region in which the slit portion S and the slit insulating layer 500 are formed in the sixth surface 106 of the body 100 shown in FIG. 8. In this case, a contact area between the external electrodes 410 and 420 and the body 100 may increase, thereby increasing a bonding force therebetween. In addition, when the bonding layers 411 and 421 in contact with the first and second lead-out portions 331, 341; 332, and 342 of the external electrodes 410 and 420 are conductive resins, the bonding force between the external electrodes 410 and 420 and the body 100 may be further improved because all of the body 100 and the bonding layers 411 and 421 include the insulating resin.

Referring to FIG. 9, the external electrodes 410 and 420 may be spaced apart from each other in the length direction L on the sixth surface 106 of the body 100 and may be disposed to be spaced apart from first and second edge portions, among four edge portions of the sixth surface 106 of the body 100, facing each other in the length direction L. Specifically, the second external electrode 420 may be disposed in a left region of the region in which the slit portion S and the slit insulating layer 500 are formed in the sixth surface 106 of the body and may be disposed to be spaced apart from the edge portions between the sixth surface 106 of the body 100 and the second surface 102 of the body 100. The first external electrode 410 may be disposed in a right region of the region in which the slit portion S and the slit insulating layer 500 are formed in the sixth surface 106 of the body and may be disposed to be spaced apart from the edge portions between the sixth surface 106 of the body 100 and the first surface 101 of the body 100. The surface insulating layer 600 to be described later is disposed in the left region of the second external electrode 420 on the sixth surface 106 of the body 100 and in the right region of the first external electrode 410 on the sixth surface 106 of the body 100. In the case of the structure of the external electrodes 410 and 420 shown in FIG. 9, an electrical short-circuit of the coil component 1000 according to the present exemplary embodiment with another component mounted on an outer side thereof in the length direction L may be prevented, while the bonding force between the external electrodes 410 and 420 and the body 100.

Referring to FIG. 7, the external electrodes 410 and 420 may be disposed to be spaced apart from each other in the length direction L on the sixth surface 106 of the body 100 and may be disposed to be spaced apart from each of the four edge portions of the sixth surface 106 of the body 100. Specifically, the second external electrode 420 is disposed in a left region of the region in which the slit portion S and the slit insulating layer 500 are formed on the sixth surface 106 of the body and is spaced apart from the edge portions between the sixth surface 106 of the body 100 and each of the second to fourth surfaces 102, 103, and 104 of the body 100. The first external electrode 410 is disposed in a right region of the region in which the slit portion S and the slit insulating layer 500 are formed on the sixth surface 106 of the body and is spaced apart from the edge portions between the sixth surface 106 of the body 100 and each of the first, third, and fourth surfaces 101, 103, and 104 of the body 100. In addition, each of the first and second external electrodes 410 and 420 may be disposed to be spaced apart from the slit insulating layer 500. The surface insulating layer 600 to be described later may be disposed on the sixth surface 106 of the body 100, excluding the region in which the first and second external electrodes are disposed and the region in which the slit insulating layer 500 is disposed in the sixth surface 106 of the body 100. In the case of the structure of the external electrodes 410 and 420 shown in FIG. 7, an electrical short-circuit of the coil component 1000 according to the present exemplary embodiment with another component mounted on an outer side thereof in the length direction L and/or width direction W may be prevented.

The slit portion S is formed in a region between the first and second external electrodes 410 and 420 on the sixth surface 106 of the body 100. The slit portion S may be formed in the region between the first and second external electrodes 410 and 420 to increase a current path between the first and second external electrodes 410 and 420, thereby preventing an electrical short-circuit between the first and second external electrodes 410 and 420. That is, in the case of the present exemplary embodiment in which the slit portion S is formed, a distance between the first and second external electrodes 410 and 420 on the surface of the body 100 may increase as compared to a case where the slit portion is not formed, and as a result, a risk of an electrical short-circuit between the first and second external electrodes 410 and 420 may be reduced.

The slit portion S may be formed by dicing a coil bar in which a plurality of bodies are connected to individualize bodies of a plurality of components and performing slit dicing or wire sawing on the sixth surface 106 of the body 100. The slit portion S and the slit insulating layer 500 to be described later may be formed on the body 100 before a process of forming the external electrodes 410 and 420. Accordingly, the slit portion S and the slit insulating layer 500 may prevent a short circuit between the external electrodes 410 and 420 in a plating process for forming the external electrodes 410 and 420.

The slit insulating layer 500 is disposed in the slit portion S. The slit insulating layer 500 covers the magnetic metal powder particles 20 and 30 exposed to an inner surface of the slit portion S to prevent an electrical short-circuit between the first and second external electrodes 410 and 420. In view of increasing a current path between the first and second external electrodes 410 and 420, the slit insulating layer 500 is preferably formed as a conformal film corresponding to a shape of the slit portion S, but the scope of the invention is not limited thereto. For example, the slit insulating layer 500 may be formed to fill the slit portion S, and in this case, the slit insulating layer 500 may be more easily disposed in the slit portion S. Meanwhile, when the slit insulating layer 500 is formed as a conformal film, a concave portion corresponding to a shape of the inner surface of the slit portion S is formed in the slit insulating layer 500, and such a concave portion may accommodate at least a portion of a coupling member such as a solder ball used to mount the coil component 1000 according to the present exemplary embodiment on a mounting board or the like. The slit insulating layer 500 may include at least one of a thermoplastic resin such as polystyrene, vinyl acetate, polyester, polyethylene, polypropylene, polyamide, rubber, acrylic, or the like, a thermosetting resin such as phenol, epoxy, urethane, melamine, alkyd, or the like, and a photosensitive insulating resin. The slit insulating layer 500 may be formed by applying an insulating paste to the inner surface of the slit portion S, but the scope of the present disclosure is not limited thereto.

The surface insulating layers 600 and 21 are disposed in a region of the sixth surface 106 of the body 100 excluding the region in which the external electrodes 410 and 420 are formed and the region in which the slit insulating layer 500 is formed. The surface insulating layers 600 and 21 are also disposed on at least a portion of each of the first to fifth surfaces 101, 102, 103, 104, and 105 of the body 100. In this exemplary embodiment, the surface insulating layers 600 and 21 are disposed to cover each of the first to fifth surfaces 101, 102, 103, 104, and 105 of the body 100, and is disposed in the aforementioned region of the sixth surface 106 of the body 100.

The surface insulating layer 600 may be formed by applying and curing an insulating material including an insulating resin on the second surface 102 of the body 100 as shown in FIG. 4, for example. In this case, the surface insulating layer 600 may include at least one of a thermoplastic resin such as polystyrene, vinyl acetate, polyester, polyethylene, polypropylene, polyamide, rubber, acrylic, or the like, a thermosetting resin such as phenol, epoxy, urethane, melamine, alkyd, or the like, and a photosensitive insulating resin. The surface insulating layer 600 may be formed, for example, by disposing the sixth surface 106 of the body 100 to be in contact with the support member and spraying an insulating material for forming the surface insulating layer 600 to the entirety of the first to fifth surfaces 101, 102, 103, 104, and 105 of the body 100, but the scope of the present disclosure is not limited thereto. As another example, the surface insulating layer 600 may be formed by forming an insulating material on the first to fifth surfaces 101, 102, 103, 104, and 105 of the body 100 by vapor deposition such as chemical vapor deposition (CVD). In the case of the methods described above, the surface insulating layer 600 may be formed on the first to fifth surfaces 101, 102, 103, 104, and 105 of the body 100 through a single process as compared to a case where the insulating layer is formed on each of the first to fifth surfaces 101, 102, 103, 104, and 105 of the body 100, thereby reducing the number of processes.

The surface insulating layer 21 is formed on the exposed surfaces of the magnetic metal powder particles 20 and 30 exposed to the second surface 102 of the body 100 as shown in FIG. 5 and may be an oxide insulating film containing a metal of the magnetic metal powder particles 20 and 30. When the surface insulating layer 21 is an oxide insulating film, the surface insulating layer 21 may be formed by performing an acid treatment on the surfaces 101, 102, 103, 104, 105, and 106 of the body 100 after the dicing. In this case, since an acid treatment solution selectively reacts with the exposed magnetic metal powder particles 20 and 30 to form the surface insulating layer 21, an oxide insulating film, the surface insulating layer 21 includes the metal component of the exposed magnetic metal powder particles 20 and 30.

Meanwhile, due to a relatively porous structure of a cured product of the insulating resin 10 of the body 100, the acid treatment solution may penetrate to a certain depth h1 from the surfaces 101, 102, 103, 104, 105, and 106 of the body 100. As a result, the surface insulating layer 21, an oxide insulating film, may also be formed on at least a portion of the surfaces of the magnetic metal powder particles 20 and 30 not exposed to the surfaces 101, 102, 103, 104, 105, and 106 of the body 100 but disposed at a certain depth from the surfaces 101, 102, 103, 104, 105, and 106 of the body 100, as well as on the surfaces of the magnetic metal powder particles 20 and 30 whose surfaces are at least partially exposed to the surfaces 101, 102, 103, 104, 105, and 106 of the body 100. Here, the certain depth from the surfaces 101, 102, 103, 104, 105, and 106 of the body 100 may be defined as a depth of about 0.5 times the particle diameter of the first powder 20 described above.

Since the particle diameter of the first powder 20 is larger than the particle diameter of the second powder 30, the surface insulating layer 21, an oxide insulating film, may be generally formed on the surface of the first powder 20. That is, both the first powder 20 and the second powder 30 may be disposed within a certain depth from the sixth surface 106 of the body 100, but the second powder 30 may be dissolved in the acid treatment solution during the acid treatment because it has a relatively small particle diameter. The second powder 30 may be dissolved in the acid treatment solution to form a void V in a region within a certain depth from the surfaces 101, 102, 103, 104, 105, and 106 of the body 100. As a result, the void V corresponding to a volume of the second powder 30 may remain in the insulating resin 10 disposed within the certain depth from the surfaces 101, 102, 103, 104, 105, and 106 of the body 100 described above. As described above, the particle diameter of the second powder 30 refers to a particle diameter according to a particle diameter distribution, and thus, the volume of the second powder 30 also refers to a volume distribution. Therefore, that the volume of the void V corresponds to the volume of the second powder 30 may mean that the volume distribution of the void V is substantially the same as a volume distribution of the second powder 30.

The surface insulating layer 21, an oxide insulating film, is formed as the magnetic metal powder particles 20 and 30, in which at least portions of surfaces thereof are exposed to the surfaces 101, 102, 103, 104, 105, and 106 of the body 100 or which are disposed within a certain depth from the surfaces 101, 102, 103, 104, 105, and 106 of the body 100, react with an acid. Accordingly, the surface insulating layer 21 may be discontinuously formed on the second surface 102 of the body 100 as shown in FIG. 5. In addition, a concentration of oxygen ions in the surface insulating layer 21 may decrease in a direction from the outside toward the inside of the magnetic metal powder particles 20 and 30. That is, as the surfaces of the magnetic metal powder particles 20 and 30 are exposed to the acid treatment solution for a longer time than the inner side, concentrations of oxygen ions in the surface insulating layer 21 differ depending on the depth. As a result, cracks CR may be formed in the surface insulating layer 21 due to an imbalance of a metal component based on an oxidation-reduction reaction. Meanwhile, for the aforementioned reasons, the surface insulating layer 21 of the present disclosure is distinguished from a technique of applying or coating a separate oxide film on the magnetic metal powder particles 20 and 30.

Meanwhile, as shown in FIG. 5, based on any one of the magnetic metal powder particles 20 and 30 disposed within a certain depth from the surfaces 101, 102, 103, 104, 105, and 106 of the body 100, the surface insulating layer 21, an oxide insulating film, may be formed on the entire surfaces of the magnetic metal powder particles 20 and 30 or may be formed only in regions of the surfaces of the magnetic metal powder particles 20 and 30.

Meanwhile, in FIGS. 4 and 5, a case where the surface insulating layers 600 and 21 include an insulating resin and a case where the surface insulating layers 600 and 21 are oxide insulating films are separately illustrated, but this is only an example and the surface insulating layer may include both separate layers including the aforementioned oxide insulating layer 21 and the aforementioned insulating resin.

The coil component 1000 according to the present exemplary embodiment may further include an insulating film IF formed on the surface of the support substrate 200 and the coil unit 300. The insulating film IF, which serves to insulate the coil unit 300 from the body 100, may include a known insulating material such as parylene, but is not limited thereto. The insulating film IF may be formed by a method such as vapor deposition, but is not limited thereto, and may be formed by stacking an insulating film on both surfaces of the support substrate 200.

As set forth above, according to exemplary embodiments of the present disclosure, an electrical short-circuit between the external electrodes may be prevented.

While exemplary embodiments have been shown and described above, it will be apparent to those skilled in the art that modifications and variations could be made without departing from the scope of the present disclosure as defined by the appended claims.

What is claimed is:

1. A coil component comprising:

a body; a support substrate disposed in the body;

a coil unit disposed on the support substrate to be perpendicular to a first surface of the body and including first and second lead-out portions exposed to the first surface of the body and spaced apart from each other; first and second external electrodes disposed to be spaced apart from each other on the first surface of the body and connected to the first and second lead-out portions, respectively; and a slit portion formed in a region of the first surface of the body between the first and second external electrodes; and a slit insulating layer disposed in the slit portion, wherein each of the first and second external electrodes is disposed to be spaced apart from the slit portion, and each of the first and second external electrodes is spaced apart from the slit insulating layer.

2. The coil component of claim 1, further comprising a slit insulating layer extends to contact the first surface, and the slit insulating layer corresponds to a shape of the slit portion.

3. The coil component of claim 1, wherein each of the first and second lead-out portions includes lead patterns and auxiliary lead patterns disposed on both surfaces of the support substrate facing each other.

4. The coil component of claim 3, wherein each of the first and second lead-out portions further includes a connection via connecting the lead pattern and the auxiliary lead pattern through the support substrate.

5. The coil component of claim 1, wherein the first and second external electrodes are disposed to be spaced apart from each other in a first direction on the first surface of the body, and the first and second external electrodes are spaced apart from first and second edge portions of the first surface of the body facing each other in the first direction.

6. The coil component of claim 5, wherein the first and second external electrodes are spaced apart from third and fourth edge portions of the first surface of the body, and the third and fourth edge portions of the first surface of the body connect the first and second edge portions, respectively.

7. The coil component of claim 6, further comprising:

a surface insulating layer disposed between the first and second external electrodes and the first to fourth edge portions of the first surface of the body.

8. The coil component of claim 7, wherein the body further includes a second surface facing the first surface thereof, a first end surface and a second end surface connecting the first surface and the second surface of the body and facing each other, and a first side surface and a second side surface connecting the first end surface and the second end surface and facing each other, and the surface insulating layer is disposed in at least a portion of each of the second surface, the first side surface, the second side surface, the first end surface, and the second end surface of the body.

9. The coil component of claim 8, wherein the body includes a magnetic metal powder and an insulating resin, and the surface insulating layer is formed on an exposed surface of the magnetic metal powder exposed to at least one of the surfaces of the body and includes a metal of the magnetic metal powder.

10. The coil component of claim 8, wherein the surface insulating layer includes an insulating resin.

11. The coil component of claim 1, wherein each of the first and second external electrodes includes a bonding layer in contact with the first and second lead-out portions and a plating layer formed on the bonding layer.

12. The coil component of claim 11, wherein the bonding layer is a conductive resin layer including a conductive power and an insulating resin.

13. A coil component comprising:

a support substrate having a first surface; a coil unit comprising a coil pattern having at least one turn and first and second lead-out portions spaced apart from each other, the coil unit being disposed on the support substrate; a body encapsulating the support substrate and the coil unit such that the first surface of the support substrate extends along a length-thickness plane of the body, the body having a mounting surface in a width-length plane perpendicular to the first surface of the support substrate, the mounting surface exposing a portion of the first and second lead-out portions; a notch disposed on the mounting surface of the body, recessed into the mounting surface in a thickness direction and between the exposed portion of first and second lead-out portions, the notch extending along a width direction; a filler insulating layer filling at least a portion of the notch and extending to the mounting surface of the body; and first and second external electrodes disposed on the mounting surface to be spaced apart by the notch and spaced apart from the notch, wherein each of the first and second external electrodes is spaced apart from the filler insulating layer.

14. The coil component of claim 13, wherein the first and second external electrodes respectively contact the exposed portion of the first and second lead-out portions.

15. The coil component of claim 13, wherein the first and second external electrodes are spaced apart from edges of body on the mounting surface.

16. The coil component of claim 13, wherein the first and second external electrodes are disposed on the mounting surface in the thickness direction.

17. The coil component of claim 13, wherein the coil pattern comprises a first coil pattern disposed on the first surface of the support substrate and a second coil pattern disposed on a second surface of the support substrate opposing the first surface in the width direction.

18. The coil component of claim 17, wherein the first lead-out portion extends from an outer end of the first coil pattern and contacts the first external electrode, the second lead-out portion extends from an outer end of the second coil pattern and contacts the second external electrode, and inner ends of the first and coil patterns are connected by a via penetrating the support substrate.

19. The coil component of claim 17, further comprising first and second auxiliary lead portions disposed on the support substrate respectively opposing the first and second lead-out portions and having a portion thereof exposed through the mounting surface.

20. The coil component of claim 19, wherein the first and second auxiliary lead portions connect respectively to the first and second lead-out portions by connection vias penetrating the support substrate, and wherein the first and second external electrodes respectively contact the first and second auxiliary lead portions.

* * * * *